(12) United States Patent
Vaquette

(10) Patent No.: US 10,715,045 B1
(45) Date of Patent: Jul. 14, 2020

(54) METHODS AND SYSTEMS OF OPERATING POWER CONVERTERS

(71) Applicant: SEMICONDUCTOR COMPONENTS INDUSTRIES, LLC, Phoenix, AZ (US)

(72) Inventor: Yann Vaquette, Labastidette (FR)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 16/454,813

(22) Filed: Jun. 27, 2019

Related U.S. Application Data

(60) Provisional application No. 62/796,665, filed on Jan. 25, 2019.

(51) Int. Cl.
*H02M 3/335* (2006.01)
*H02M 1/08* (2006.01)
*H02M 1/00* (2006.01)

(52) U.S. Cl.
CPC ......... *H02M 3/33507* (2013.01); *H02M 1/08* (2013.01); *H02M 2001/0009* (2013.01)

(58) Field of Classification Search
CPC . H02M 2001/0022; H02M 2001/0025; H02M 3/335; H02M 3/33507; H02M 3/33523
See application file for complete search history.

(56) References Cited

U.S. PATENT DOCUMENTS

| 5,892,355 | A | 4/1999 | Pansier et al. |
| 6,542,386 | B2 | 4/2003 | Mobers et al. |
| 7,161,815 | B2 * | 1/2007 | Mori ................. H02M 3/33507 363/21.12 |
| 7,239,532 | B1 * | 7/2007 | Hsu .................... H02M 3/33523 363/21.12 |

(Continued)

OTHER PUBLICATIONS

"NCP1360, NCP1365 Low Power Offline Constant Current & Constant Voltage Primary Side PWM Current-Mode Controller with/without High Voltage Startup Current Source," Product Sheet No. NCP1360/D, Jun. 2016—Rev. 3, 29 pages, Copyright Semiconductor Components Industries, LLC, 2016.

(Continued)

*Primary Examiner* — Gary L Laxton
(74) *Attorney, Agent, or Firm* — Dickinson Wright PLLC

(57) ABSTRACT

Operating power converters. At least some of the example embodiments are methods including: storing energy in a field of a transformer arranged for flyback operation, the storing by making conductive a primary switch coupled to a primary winding of the transformer; ceasing the storing of energy when a primary current through the primary winding reaches a predetermined value; measuring on time of the primary switch, the measuring creates a value indicative of on time; transferring energy from the field of the transformer; measuring discharge time of the energy from the field of the transformer during the transferring, the measuring of the discharge time creates a value indicative of discharge time; calculating a value indicative of input volt- (Continued)

age of the power converter using the value indicative of on time and the value indicative of discharge time; and then compensating the predetermined value used in a subsequent storing energy step.

20 Claims, 5 Drawing Sheets

(56) References Cited

U.S. PATENT DOCUMENTS

| | | |
|---|---|---|
| 8,711,578 B2 | 4/2014 | Turchi |
| 2008/0192515 A1 | 8/2008 | Huynh et al. |
| 2009/0147547 A1* | 6/2009 | Yamashita ........ H02M 3/33507 363/21.16 |
| 2010/0079124 A1 | 4/2010 | Melanson |
| 2018/0191255 A1* | 7/2018 | Mizoe .................... H02M 1/08 |

OTHER PUBLICATIONS

"HVLED805 Off-line LED driver with primary-sensing," Product Sheet ID 18077-Rev 1, Oct. 2010, 29 pages, Copyright STMicroelectronics, 2010.

\* cited by examiner

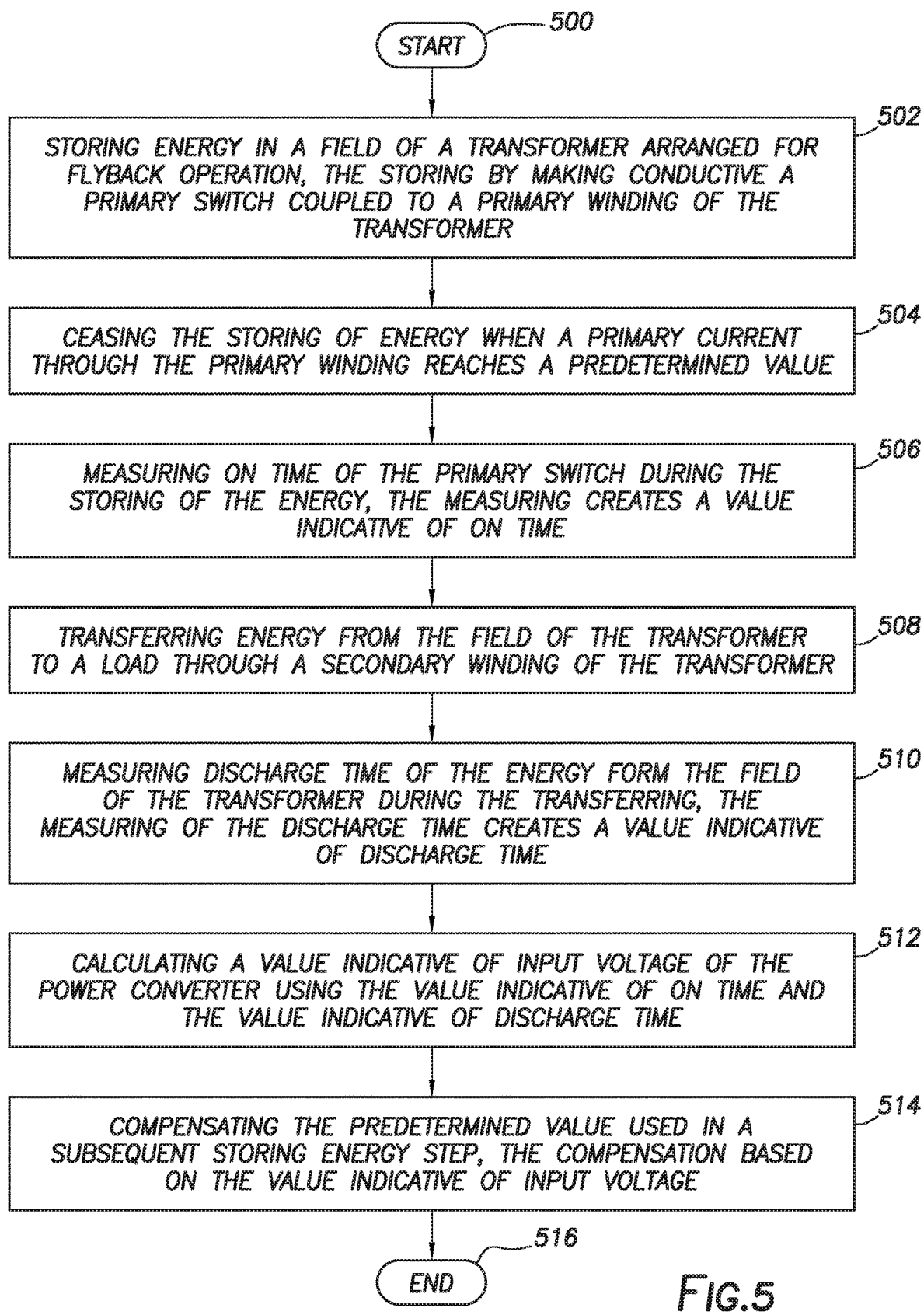

US 10,715,045 B1

METHODS AND SYSTEMS OF OPERATING POWER CONVERTERS

CROSS-REFERENCE TO RELATED APPLICATIONS

This application claims the benefit of U.S. Provisional Patent Application No. 62/796,665, filed on Jan. 25, 2019, the entire contents of which is incorporated herein by reference.

BACKGROUND

Switched power converters convert an input voltage to an output voltage. In some cases, the power converter implements a feedback or regulation loop used to enable a stable and accurate output voltage or output current. Changes in magnitude of the input voltage create difficulties in maintaining an accurate output current.

BRIEF DESCRIPTION OF THE DRAWINGS

For a detailed description of example embodiments, reference will now be made to the accompanying drawings in which:

FIG. 5 shows a method in accordance with at least some embodiments.

DEFINITIONS

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection or through an indirect connection via other devices and connections.

In relation to electrical devices, the terms "input" and "output" refer to electrical connections to the electrical devices, and shall not be read as verbs requiring action. For example, a controller may have a gate output and one or more sense inputs.

"Controller" shall mean individual circuit components, an application specific integrated circuit (ASIC), a microcontroller with controlling software, a digital signal processor (DSP), a processor with controlling software, a field programmable gate array (FPGA), or combinations thereof, configured to read inputs and drive outputs responsive to the inputs.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Various example embodiments are directed to methods and systems of operating power converters. More particularly, at least some example embodiments are power converters with isolation transformers configured for flyback operation, and further configured to operate in a constant current mode where the output current is constant. Operating in the constant current mode may include regulating or compensating the primary current measurement at which the energy storage cycle ceases to adjust for changes in input voltage in cases where input voltage is not directly measured. More particularly still, example embodiments create in a first energy storage cycle a value indicative of input voltage by determining a ratio of the on time of the primary switch to discharge time of the field associated with the flyback operation. The value indicative of input voltage is then used as a feed forward in a subsequent energy storage cycle to compensate for changes in input voltage. The specification now turns to an example system to orient the reader.

Figure 1:
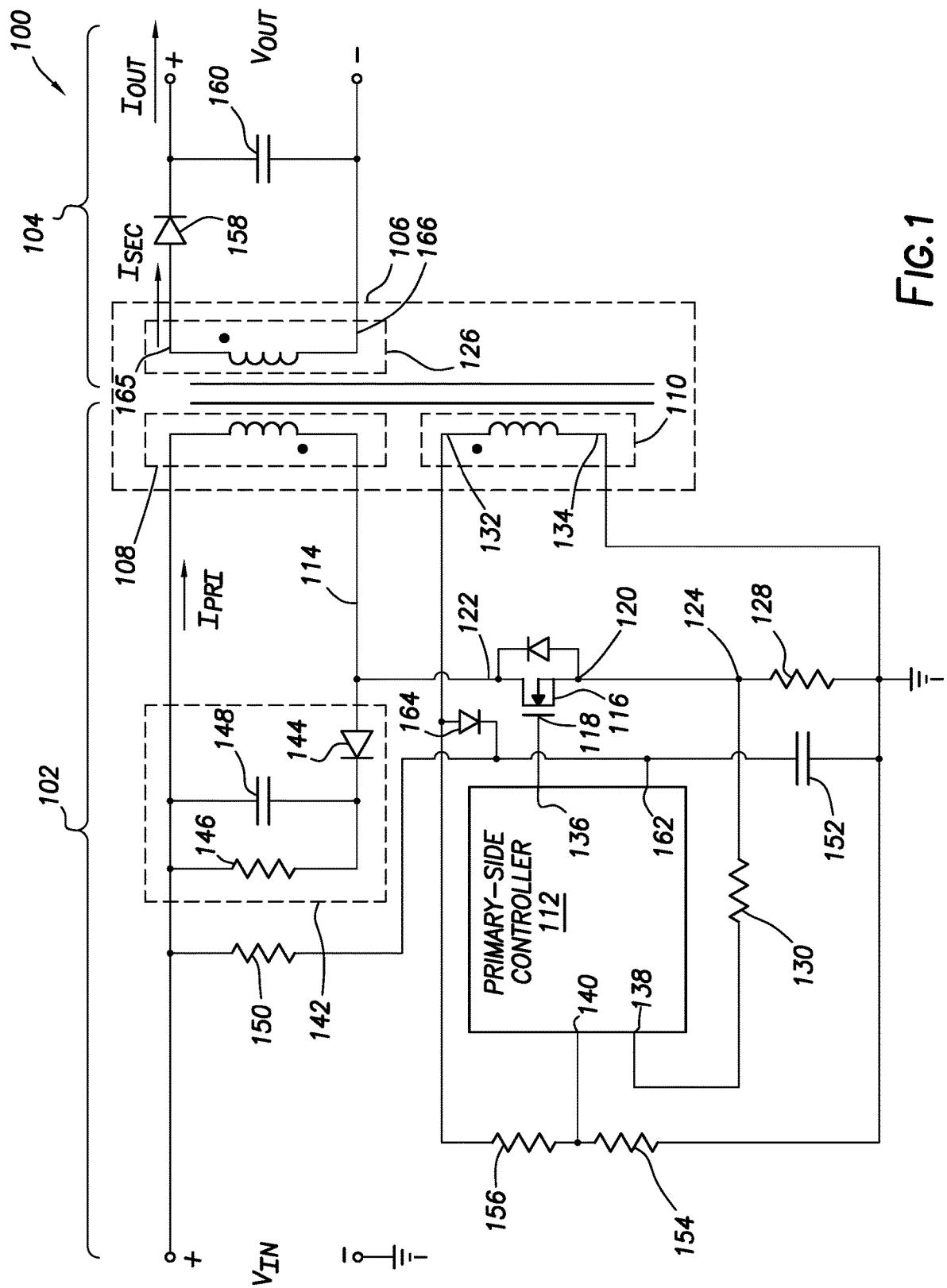
FIG. 1 shows a schematic diagram of a power converter in accordance with at least some embodiments.

FIG. 1 shows a schematic diagram of a switched power converter 100 (hereafter "power converter 100") in accordance with at least some embodiments. In particular, the power converter 100 comprises a primary side 102 galvanically isolated from a secondary side 104 by way of a transformer 106. The transformer 106 comprises a primary winding 108, a secondary winding 126, and an auxiliary winding 110, the role of each described further below. A direct current (DC) input voltage $V_{IN}$ is supplied to the power converter 100, and the power converter 100 creates a DC output voltage $V_{OUT}$, the output voltage $V_{OUT}$ in many cases lower than the input voltage $V_{IN}$. $V_{IN}$ can also represent an alternating current (AC) voltage source coupled to a bride diode and a bulk capacitor.

The primary side 102 of the power converter 100 comprises the primary winding 108 of the transformer 106 and a primary switch illustratively shown as field effect transistor (FET) 116 (hereafter "primary FET 116") coupled to the primary winding 108. The primary winding 108 defines a first lead or connection coupled to the positive side of the input voltage $V_{IN}$ and a second lead or connection of the primary winding 108 defines a switch node 114.

The primary FET 116 defines a gate 118, a first connection or source 120, and a second connection or drain 122. The gate 118 couples to a gate terminal 136 of the primary-side controller 112. The drain 122 couples to the switch node 114 and thus the second lead of the primary winding 108. The source 120 couples to a first lead of a sense resistor 128, and the second lead of the sense resistor 120 couples to a ground. The connection between the source 120 and the first lead of the sense resistor 128 defines a sense node 124.

In order for the primary-side controller 112 to sense primary current during an energy storage cycle (discussed more below), the primary-side controller 112 defines a current sense terminal 138 coupled to the sense node 124 by way of a resistor 130. In particular, a first lead of the resistor 130 couples to the current sense terminal 138, and a second lead of the resistor 130 couples to the sense node 124. The primary side 102 also comprises the auxiliary winding 110 of the transformer 106. The auxiliary winding 110 defines a first lead 132 and a second lead 134. The first lead 132 couples to a voltage divider comprising resistors 156 and 154, and the second lead 134 couples to ground in the example system.

Still referring to FIG. 1, the primary-side controller 112 defines the gate terminal 136, the current sense terminal 138, and a winding sense terminal 140. The gate terminal 136 couples to the gate 118 of the primary FET 116, the current sense terminal 138 couples to the sense node 124 by way of the resistor 130, and the winding sense terminal 140 couples to the node between resistors 154 and 156 of the voltage divider. Although the primary FET 116 is illustrated outside the primary-side controller 112, in some examples the primary FET 116 is integrated into the primary-side controller 112.

The primary-side controller 112 further defines a $V_{CC}$ terminal 162 that couples to the DC input voltage $V_{IN}$ by way of a resistor 150. In particular, a first lead of the resistor 150 couples to the input voltage $V_{IN}$, and a second lead of the resistor 150 couples to the $V_{CC}$ terminal 162. The $V_{CC}$ terminal 162 additionally couples to the first lead 132 of the auxiliary winding 110 by way of a diode 164. In particular, the first lead 132 of the auxiliary winding 110 couples to the anode of the diode 164 and the cathode of the diode 164 couples to the $V_{CC}$ terminal 162. Additionally, the $V_{CC}$ terminal 162 couples to capacitor 152, where a first end of the capacitor 152 couples the $V_{CC}$ terminal 162, and a second end of the capacitor 152 couples the ground. The capacitor 152 is charged from either input voltage $V_{IN}$ or the auxiliary winding 110 through the diode 164. Energy to power the primary-side controller 112 may thus flow into the $V_{CC}$ terminal 162 from the input voltage $V_{IN}$ (e.g., startup situations), from the auxiliary winding 110, and/or the capacitor 152.

The example primary side 102 further comprises a snubber circuit 142 in the example form of a diode 144 having its anode coupled to the switch node 114, and a cathode. The cathode of the diode 144 couples to a parallel resistor-capacitor (RC) circuit comprising resistor 146 coupled in parallel with capacitor 148. The opposite end of the RC circuit couples the first lead of the resistor 150. As the name implies, the snubber circuit 142 reduces voltage spikes at switch node 114 caused by the leakage inductance of the primary winding 108 when the primary FET 116 is turned off.

Still referring to FIG. 1, the secondary side 104 of the example power converter 100 comprises a secondary winding 126 of the transformer 106. A first connection or first lead 165 of the secondary winding 126 couples to the positive terminal of the output voltage $V_{OUT}$ by way of a rectifier illustratively shown as diode 158. In particular, the first lead 165 couples to the anode of diode 158 and the cathode of diode 158 couples to the positive terminal of the output voltage $V_{OUT}$. Thus, the example secondary side 104 implements passive rectification; however, in other cases the rectifier on the secondary side may be a synchronous rectifier (such as a FET and a secondary-side controller making the FET conductive and non-conductive to implement the rectification). The secondary winding 126 further defines a second connection or second lead 166 that couples to the negative terminal of the output voltage $V_{OUT}$. The secondary side 104 further comprises smoothing capacitor 160 coupled between the positive terminal of the output voltage $V_{OUT}$ and the negative terminal of the output voltage $V_{OUT}$.

The transformer 106 in the example power converter 100 is set up for flyback operation, and operates by storing energy in the field of the transformer 106 (e.g., by causing current flow in the primary winding 108) and then transferring energy from the field of the transformer 106 to a load through the secondary winding 126. Thus, the transformer 106 can be said to operate in two cycles: an energy storage cycle, in which the primary FET 116 is conductive and energy is stored in the field of the transformer 106; and a discharge cycle in which the primary FET 116 is non-conductive and energy is transferred from the field of the transformer to the load by way of the secondary winding 126. As described further below—the energy storage cycle coincides with an "on time" of the primary FET 116, while the discharge cycle coincides with a "discharge time" of the field of the transformer 106 when the primary FET 116 is non-conductive.

With respect to the energy storage cycle, when the primary FET 116 is conductive electrical current flows from the input voltage $V_{IN}$, through the primary winding 108, through the primary FET 116, and through the sense resistor 128 to ground. Specifically, a primary-side current ($I_{PRI}$), also referred to herein as "primary current," flows in the primary winding 108 and acts to store energy in a field associated with the transformer 106. During periods of time when the primary FET 116 is conducting, a voltage is induced on the secondary winding 126 with a polarity as shown by the dot convention in FIG. 1. The polarity reverse biases the diode 158, and thus no current flows through the secondary winding 126 during the energy storage cycle. Once the primary current reaches a predetermined value (i.e., a "primary-side current setpoint"), the primary FET 116 is made non-conductive, and thus the power converter 100 ceases to store energy.

The example power converter 100 enters the discharge cycle when the primary FET 116 is made non-conductive. In the discharge cycle, the voltage induced on the secondary winding 126 reverses from that of the energy storage cycle, the diode 158 begins to conduct (i.e., the diode 158 is forward biased), and the collapsing field of the transformer 106 produces secondary-side current (i.e., $I_{SEC}$), also referred to herein as "secondary current." The secondary current through secondary winding 126 produces the output voltage $V_{OUT}$ and corresponding output current $I_{OUT}$. The $V_{OUT}$ and $I_{OUT}$ are applied to a load (not specifically shown).

The auxiliary winding 110 on the primary side 102 responds both to the primary current and the secondary current. In particular, during the energy storage cycle when primary current is flowing through the primary winding 108, a voltage is induced on the auxiliary winding 110 proportional to the turns ratio between the primary and auxiliary windings, and with a polarity as defined by dot convention within the figure. Thus, during the energy storage cycle the first lead 132 is more negative than the second lead 134. Diode 164 blocks reverse current flow from both the capacitor 152 and through resistor 150 during the energy storage cycle. However, when the primary current in the primary winding 108 ceases and secondary current in the secondary winding 126 flows (e.g., the discharge cycle), a voltage is induced on the auxiliary winding 110 proportional to the turns ratio between the secondary and auxiliary windings, and again with a polarity as defined by dot convention within the figure. The voltage on the auxiliary winding is thus proportional to the voltage on the anode of diode 158 during periods of time when the secondary current is flowing. In some embodiments, the voltage across the auxiliary winding 110 during the discharge cycle is sensed by the primary-side controller and used to infer a discharge time of the transformer 106 and the magnitude of the output voltage $V_{OUT}$.

Although in this example a discharge time of the transformer 106 and the magnitude of the output voltage is inferred from a voltage across the auxiliary winding 110, in other embodiments the voltage across the primary winding 108 can be used for a similar purpose.

Still referring to FIG. 1, in example systems the power converter 100 has two modes of operation: a constant output voltage mode (hereafter just "constant voltage mode"); and a constant output current mode (hereafter just "constant current mode"). The primary-side controller 112 implements a respective control loop for each mode that determines a primary-side current setpoint that is used during energy storage cycles. During the constant voltage mode, the example primary-side controller 112 is configured to indirectly measure the output voltage $V_{OUT}$ by way of the auxiliary winding 110 and winding sense terminal 140, and make adjustments as needed to maintain a setpoint output voltage $V_{OUT}$. In example systems operating in the constant voltage mode, the auxiliary voltage captured at the end of the discharge cycle (e.g., end of transformer demagnetization) is used to adjust the primary-side current setpoint in order to control the output voltage $V_{OUT}$.

In particular, in the energy storage cycle of the constant voltage mode the primary-side controller 112 asserts the gate terminal 136 (to make the primary FET 116 conductive) and energy is stored in the field of the transformer 106. The primary-side controller 112 measures a value indicative of primary-side current ($I_{PRI}$) by way of the current sense terminal 138 coupled to the sense node 124. When the value indicative of the primary current reaches a predetermined value (i.e., a primary-side current setpoint), the primary-side controller 112 de-asserts the gate terminal 136 and thus the primary FET 116 is made non-conductive. During the discharge cycle, the primary-side controller 112 monitors a value indicative of output voltage. If the output voltage is low, the primary side controller increases the primary-side current setpoint for the next energy storage cycle. If the output voltage is high, the primary-side controller 112 decreases the primary-side current setpoint for the next energy storage cycle.

However, when the current drawn by the load (not specifically shown) gets too high, the example power converter 100 of FIG. 1 operates in the constant current mode. During the constant current mode the primary-side controller 112 controls and regulates the output current ($I_{OUT}$) at a constant value or constant level regardless of the output voltage $V_{OUT}$ conditions. In some examples, the constant current mode can be used to charge batteries. The constant level used for the output current ($I_{OUT}$) during the constant current mode may be set or selected in any appropriate way. For example, the constant level for the constant current mode may be set or selected by the primary-side controller 112, such as by resistors coupled to dedicated terminals (not specifically shown). In other cases, the constant level for the constant current mode may be communicated from the load (e.g., a smart phone or tablet device) by communication signals transmitted though the transformer 106 or other communication systems (not specifically shown).

Regardless of how the current level for the constant current mode is set, in the constant current mode the primary-side controller 112 asserts the gate terminal 136 (to make the primary FET 116 conductive) and energy is stored in the field of the transformer 106. The primary-side controller 112 measures a value indicative of primary current (i.e., $I_{PRI}$) by way of the current sense terminal 138 coupled to the sense node 124, and the primary-side controller 112 de-asserts the gate terminal 136 (thus making the primary FET 116 non-conductive) when the value indicative of the primary current reaches the predetermined value.

In some embodiments, in order to maintain accuracy in the constant current mode, compensations are implemented to account for propagation delays introduced by both the primary-side controller 112 and the primary FET 116. That is, when the primary-side controller 112 determines that the primary current $I_{PRI}$ has reached the predetermined value, the primary-side controller 112 de-asserts the gate terminal 136 to make the primary FET 116 non-conductive. However, there is a certain amount of delay within the primary-side controller 112 between when the primary current $I_{PRI}$ reaches the predetermined value and when the gate terminal 136 is de-asserted. Moreover, it takes a non-zero and finite amount of time for the primary FET 116 to become non-conductive (e.g., controlled by an amount of time to drain the charge from the gate). The time between when the primary current reaches the predetermined value and when the primary FET 116 is made non-conductive is referred to herein as the "propagation delay." As will become clearer below—if the propagation delay is not properly accounted for, potential errors occur that impact the accuracy of current control in the constant current mode.

Errors caused by the propagation delay are further exacerbated by changes in the input voltage $V_{IN}$, particularly increases in the input voltage $V_{IN}$. That is, the larger the magnitude of input voltage $V_{IN}$, the greater the rate of increase of the primary current $I_{PRI}$ during the energy storage cycle. For a given propagation delay of the primary-side controller 112 and primary FET 116, the larger the magnitude of the input voltage $V_{IN}$, the higher the primary current will be at the point in time the primary FET 116 is made fully non-conductive. Stated differently, the larger the input voltage $V_{IN}$, the higher the primary-side current $I_{PRI}$ peaks if the on time or conductive time of the primary FET 116 is constant.

In related-art devices that monitor the input voltage $V_{IN}$, the effect of changing input voltage to the peak current value may be compensated as a feed forward in the constant current mode control loop. However, in various embodiments described herein the primary-side controller 112 does not couple to the input voltage in such a way that the input voltage is sensed and monitored. Instead, in example embodiments a value indicative of the input voltage $V_{IN}$ is calculated based on the length of time the primary FET 116 was conducting (i.e., "on time" coinciding with "energy storage cycle") and the length of time in which the primary-side current is zero during the immediately subsequent discharge cycle of the transformer 106 (e.g., a "discharge time").

The relationship between the input voltage, the propagation delay, and the output current $I_{OUT}$ is discussed next. In particular, the output current $I_{OUT}$ may be defined as follows:

$$I_{out} = \frac{1}{2} \frac{N_p}{N_s} \times I_{p\_pk} \frac{t_2}{T_{SW}} \qquad (1)$$

where $N_P$ is the number of turns of the primary winding 108, $N_S$ is the number of turns of the secondary winding 126, $I_{p\_pk}$ is the peak current in the primary winding 108 during the energy storage cycle, $t_2$ is the length of time the primary-side current is zero during the immediately subsequent discharge cycle of the transformer 106, and $T_{SW}$ is a period of time comprising the sum of two time values: $t_2$ and the length of time the primary FET 116 was conducting (e.g., the length of time of the energy storage cycle—on time). The first portion in equation (1) above:

$$\frac{1}{2}\frac{N_p}{N_s} \qquad (2)$$

has a fixed value that is determined by the design of the transformer 106.

Output current $I_{OUT}$ may be kept constant by controlling the terms in the second portion in equation (1) above:

$$I_{p\_pk}\frac{t_2}{T_{SW}} \qquad (3)$$

The peak current in the primary winding 108 may be further defined as follows:

$$I_{p\_pk} = \frac{V_{CS}}{R_{sense}} + \frac{V_{in}}{L_p}t_{prop} \qquad (4)$$

where $V_{CS}$ is the voltage measured on the sense node 124, $R_{sense}$ is the resistor value of the sense resistor 128, $V_{in}$ is the input voltage, $L_p$ is the inductance of the primary winding 108, and $t_{prop}$ is the propagation delay of the primary-side controller 112 and the primary FET 116. Thus, the propagation delay and the input voltage $V_{IN}$ proportionally impact the primary-side current ($I_{PRI}$), which in turn affects the output current $I_{OUT}$.

As the primary-side controller 112 in example embodiments does not couple to the input voltage $V_{IN}$ in such a way that the input voltage is directly sensed and monitored, the example primary-side controller 112 implements a method to sense the input voltage $V_{IN}$ indirectly and compensate the primary-side current setpoint using the indirectly sensed input voltage. By calculating a value indicative of input voltage $V_{IN}$, the primary-side controller 112 effectively implements a method that accurately controls the output current $I_{OUT}$, without requiring an additional terminal coupled to the input voltage $V_{IN}$.

In example embodiments the primary-side controller 112 calculates the value indicative of input voltage $V_{IN}$ using two time parameters: $t_{on}$ and $t_2$. As described above, $t_2$ is the length of time the primary-side current is zero during the immediately subsequent discharge time of the transformer 106. The term $t_{on}$ is the length of time the primary FET 116 was conducting (e.g., "on time" during energy storage cycle). In other words, the term $t_{on}$ is based on the amount of time the gate terminal 136 of the primary-side controller 112 was asserted during the energy storage cycle.

The on-time of the primary FET 116 may be represented by the parameter $t_{on}$ defined as follows:

$$t_{on} = \frac{L_p}{V_{in}}I_{p\_pk} \qquad (5)$$

where all the variables are defined above. The length of time the primary-side current is zero during a discharge time during the discharge cycle may be represented by the parameter $t_2$ defined as follows:

$$t_2 = \frac{L_p\left(\frac{N_s}{N_p}\right)^2}{V_{out}+V_f}I_{p\_pk}\frac{N_p}{N_s} \qquad (6)$$

where $V_f$ represents the secondary side diode (diode 158) forward voltage drop, and the rest of the parameters are defined above.

Equation (6) can be further simplified as follows:

$$t_2 = \frac{L_p}{V_{out}+V_f}\frac{N_s}{N_p}I_{p\_pk} \qquad (7)$$

Dividing equation (7) by $t_{on}$ results in the ratio of $t_2/t_{on}$ as follows (after simplification):

$$\frac{t_2}{t_{on}} = \frac{V_{in}}{V_{out}+V_f}\frac{N_s}{N_p} \qquad (8)$$

The parameters on the right side of the equal sign in equation (8), aside from $V_{in}$, define a constant "k", such that equation (8) may be further simplified as follows:

$$V_{in} = k \times \frac{t_2}{t_{on}} \qquad (9)$$

Accordingly, the primary-side controller 112 can indirectly sense or calculate the input voltage $V_{IN}$ using the ratio $t_2/t_{on}$ and multiplying it by the constant "k".

In various embodiments, the primary-side controller 112 may track the ratio $t_2/t_{on}$ when operating in the constant voltage mode. However, when the primary-side controller 112 changes to the constant current mode, the primary-side controller 112 holds the ratio $t_2/t_{on}$ constant. That is, in the constant current mode the primary-side controller 112 works to keep the ratio $t_2/t_{on}$ fixed by compensating the primary-side current setpoint based on the value indicative of input voltage $V_{IN}$. Stated differently, in the constant current mode when the input voltage $V_{IN}$ goes up, the primary-side controller 112 reduces the on time of the energy storage cycle to keep the peak current $I_{p\_pk}$ constant, and thus the output current $I_{OUT}$ constant. Oppositely, in the constant current mode when the input voltage $V_{IN}$ goes down, the primary-side controller 112 increases the on time of the energy storage cycle to keep the peak current $I_{p\_pk}$ constant, and thus the output current $I_{OUT}$ constant.

Still referring to FIG. 1, in one example embodiment a resistor value of the resistor 130 is selected during the design stage to compensate for propagation delay associated with the primary FET 116. Thus, the example embodiment illustrates one way to compensate the primary-side peak current setpoint, and is not meant to be limiting.

Figure 2:
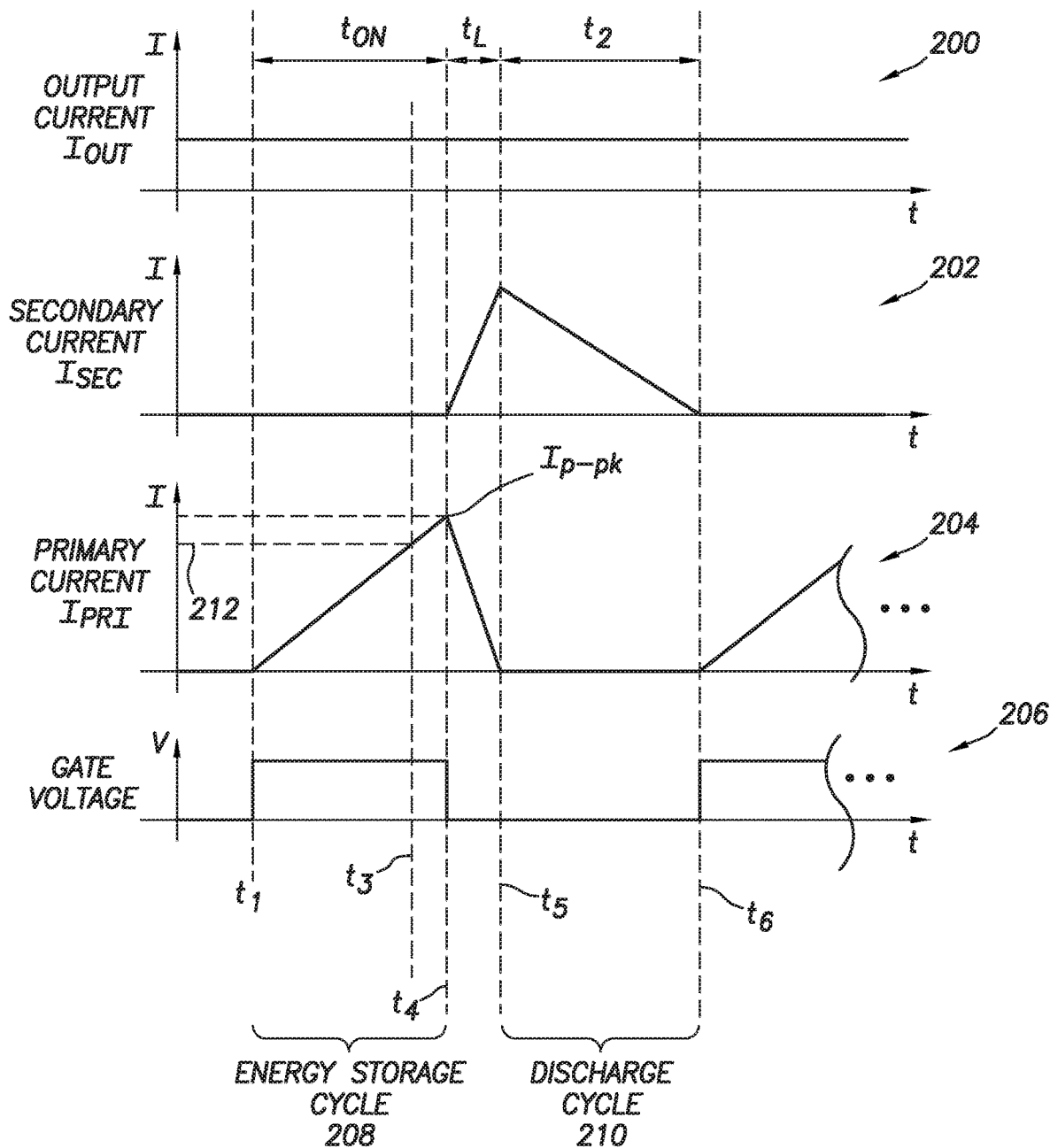
FIG. 2 shows a timing diagram in accordance with at least some embodiments.

FIG. 2 shows a timing diagram is accordance with at least some embodiments. In particular, FIG. 2 shows several signals plotted on corresponding time axis, including plot 200 showing an example output current $I_{OUT}$ 200, plot 202 showing an example secondary current $I_{SEC}$, plot 204 showing an example primary current $I_{PRI}$, and plot 206 showing an example gate voltage for the primary FET 116. The timing diagram of FIG. 2 shows a time frame in which the power converter is in an energy storage cycle 208, and a time frame in which the power converter is in the discharge cycle 210. The energy storage cycle 208 corresponds to time period $t_{on}$ discussed above. The discharge cycle 210 corresponds to time periods $t_L$ and $t_2$. The time period $t_L$ represents a time period during the discharge cycle 210 in which, due to leakage inductance effect, the primary-side current gradually drops to zero based on the leakage inductance effect. As described above, $t_2$ represents the length of time in which the primary-side current is zero during the discharge cycle 210. The duration of the energy storage cycle 208 ($t_{on}$) and the t2 portion of the discharge cycle 210 defines the time period $T_{SW}$ (discussed above with regards to equations 1 and 3).

The example energy storage cycle 208 begins at time t1 and ends at time t4. In particular and as illustrated in plot 206, at time t1 the gate 118 of primary FET 116 is asserted (in this example, asserted high), making the primary FET 116 conductive. Accordingly, a current begins to flow in the primary winding 108 as shown by plot 204. As shown in the plot 200, during the energy storage cycle 208 the output current $I_{OUT}$ is at a steady or constant rate. Also during the time frame 208, zero current is flowing in the secondary winding 126 due to the diode 158 (FIG. 1) being reverse-biased.

During the example energy storage cycle 208, the primary-side controller 112 continues to assert the gate terminal 136 (keeping the primary FET 116 conductive) until the primary-side controller 112 determines that the primary current through the primary winding 108 has reached a predetermined value 212. The predetermined value 212 represents a target amount of current after which the storing of energy ceases. The predetermined value 212 can be defined as the primary-side peak current setpoint. At time t3, the primary current reaches a primary current peak value $I_{p\_pk}$.

As shown in plot 204, the primary current $I_{PRI}$ reaches the predetermined value 212 at time t3, before the time t4. Between the times t3 and t4, after detecting the primary current $I_{PRI}$ has reached the predetermined value 212, the primary-side controller 112 begins the process of de-asserting the gate terminal 136. Due to an internal delay of the primary-side controller 112 and time associated with draining current from the gate of the primary FET 116 (FIG. 1), the de-assertion of the gate terminal 136 does not happen instantaneously (though the delay is exaggerated in FIG. 2 for purposes of clarity). The primary current $I_{PRI}$ continues to increase between times t3 and t4, due to the propagation delay, and with the gate drained and FET fully non-conductive at time t4. The primary current thus reaches a peak current in the primary $I_{p\_pk}$ value higher than the predetermined value 212.

At time t4, the transformer 106 enters the discharge cycle 210 in which energy is transferred from the field of the transformer 106. The example discharge cycle 210 is defined as starting at time t4 and ending at time t6. At time t4, the primary current $I_{PRI}$ begins to drop to zero, however, due to leakage inductance effects, the drop to zero does not happen instantaneously. At time t5, the primary current $I_{PRI}$ is zero and remains there for the remainder of the discharge cycle 210. The time period $t_2$ is defined as between t5 and t6.

Upon the primary current $I_{PRI}$ dropping to zero, the voltage induced on the secondary winding 126 reverses polarity and the diode 158 begins to conduct. Accordingly, during the discharge cycle 210, the collapsing field of the transformer 106 produces secondary current $I_{SEC}$ through the secondary winding 126 (plot 202). At time t6, the energy of the field of the transformer 106 is discharged, and the primary-side controller 112 re-asserts the gate terminal 136 again and another energy storage cycle begins anew.

Throughout the duration of the energy storage cycle 208 and the discharge cycle 210, the output current $I_{OUT}$ (plot 200) is the average of the secondary current produced during the same time period. Furthermore, the value of the primary current peak value $I_{p\_pk}$ in a given energy storage cycle influences the output current $I_{OUT}$. For example, the value of the primary current peak value $I_{p\_pk}$ occurring in the energy storage cycle 208 controls the secondary current ($I_{SEC}$) produced in the subsequent discharge cycle 210, which in turn contributes to the output current. If during successive energy storage cycles, the value of the primary current peak value $I_{p\_pk}$ increases, the secondary current in respective discharge cycles will also increase. In turn the overall average of the output current will also increase. Similarly, if during successive energy storage cycles, the value of the primary current peak value $I_{p\_pk}$ decreases, the secondary current in respective discharge cycles will also decrease. In turn, the overall average of the output current will also decrease.

In the constant voltage mode, the primary-side controller 112 tracks the ratio $t_2/t_{on}$ and holds the ratio $t_2/t_{on}$ constant by compensating a subsequent predetermined value 212 based on the value indicative of input voltage $V_{IN}$, which is calculated based on the ratio $t_2/t_{on}$. For example, in the cycle described above, a first predetermined value is set at predetermined value 212. Thus, upon determining the primary-side current has reached the predetermined value 212, the primary-side controller 112 de-asserts the primary FET 116 at time t3. In the subsequent cycle starting at t6, the primary-side controller 112 can compensate a subsequent predetermined value (i.e., a subsequent peak current setpoint), based on the value indicative of input voltage $V_{IN}$, such that the ratio $t_2/t_{on}$ is held fixed. Stated alternatively, the primary-side controller 112 controls the predetermined value, which correlates to a duration of the energy storage cycle, which correlates to a primary current peak value $I_{p\_pk}$, which in turn controls the output current.

Figure 3:
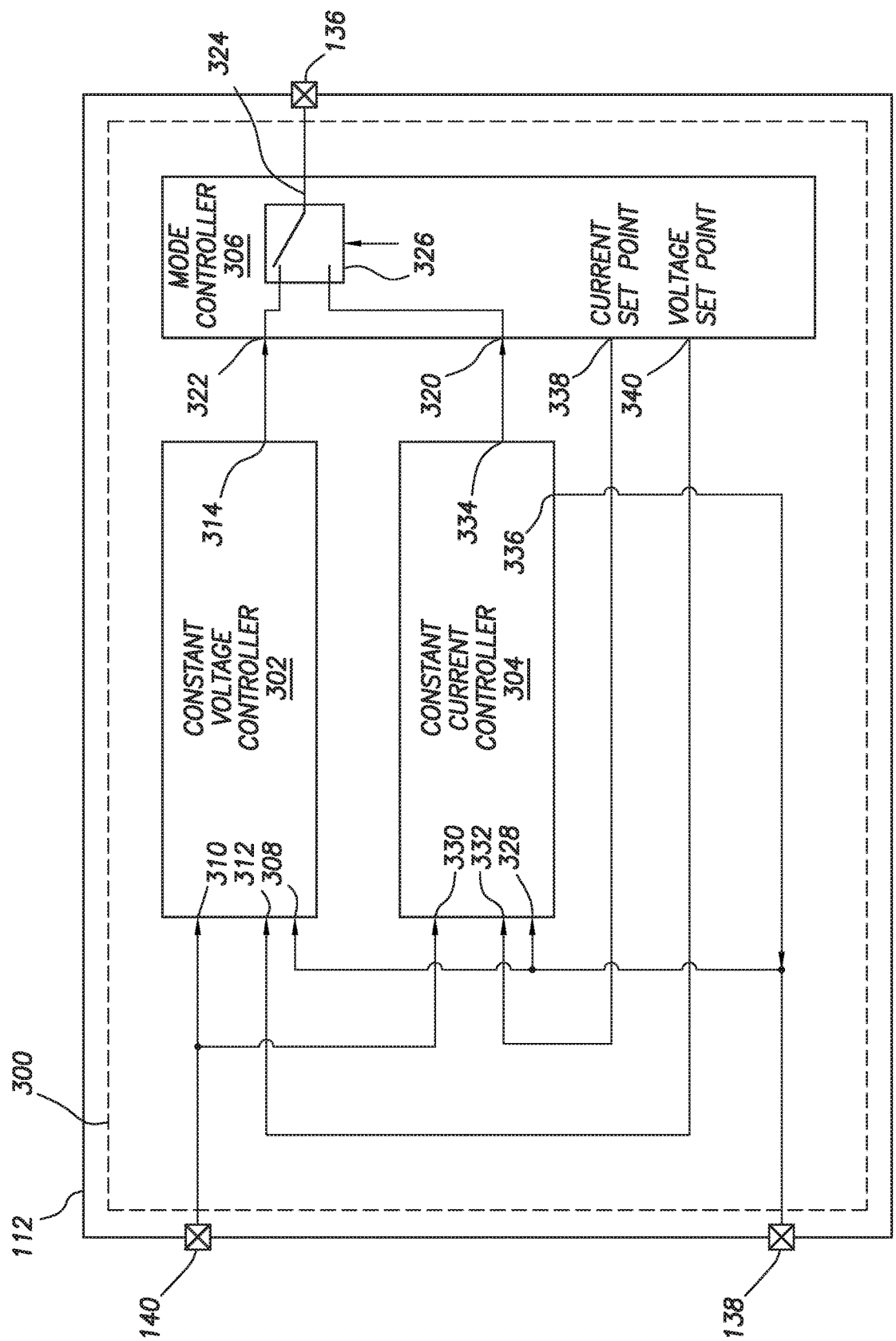
FIG. 3 shows a block diagram of a primary-side controller in accordance with at least some embodiments.

FIG. 3 shows a block diagram of the primary-side controller 112 in accordance with at least some embodiments. In particular, the example primary-side controller 112 defines the gate terminal 136, the current sense terminal 138, and the winding sense terminal 140. Additional terminals will be present (e.g., a ground terminal), but the additional terminals are not shown so as not to unduly complicate the figure. The terminals may be electrical connections to a packaged integrated circuit of any suitable type, such as a six pin dual in-line (DIP) package. Encased within the packaging are one or more substrates of silicon material upon which the various circuits are constructed. In the example shown in FIG. 3, a single silicon substrate 300 is utilized, but two or more silicon substrates may be co-packaged in accordance with other example embodiments.

The example primary-side controller 112 implements a constant voltage controller 302 constructed on the substrate 300, a constant current controller 304 constructed on the substrate 300, and a mode controller 306 constructed on the substrate 300. Bond pads or other connection points of the substrate 300 couple to terminals of the primary-side controller 112, but the bond pads and electrical connections to the terminals are not shown so as not to unduly complicate the figure.

The example constant current controller 304 defines a current sense input 328, a voltage sense input 330, a peak current input 332, a gate output 334, and a bias output 336. The current sense input 328 is coupled to the current sense terminal 138. The voltage sense input 330 is coupled to the winding sense terminal 140. The bias output 336 is coupled to the current sense terminal 138. The peak current input 332 is coupled to the mode controller 306. The constant current controller 304 is configured to implement the constant current mode holding current at a current level set by a signal on the peak current input.

The example constant voltage controller 302 defines a current sense input 308, a voltage sense input 310, a voltage setpoint input 312, and a gate output 314. The current sense input 308 of the constant voltage controller 302 is coupled to the current sense terminal 138. The voltage sense input 310 of the constant voltage controller 302 is coupled to the winding sense terminal 140. The voltage setpoint input 312 is coupled to the mode controller 306. The constant voltage controller 302 is configured to implement a constant voltage mode holding output voltage $V_{OUT}$ at a voltage level set by a signal on the voltage setpoint input 312.

The example mode controller 306 defines a first gate input 320, a second gate input 322, a gate output 324, a current setpoint output 338, and a voltage setpoint output 340. The current setpoint output 338 is coupled to the peak current input 332. The voltage setpoint output 340 is coupled to the voltage setpoint input 312. The first gate input 320 is coupled to the gate output 334 of the constant current controller 304. The second gate input 322 is coupled to the gate output 314 of the constant voltage controller 302. The gate output 324 is coupled to the gate terminal 136. The mode controller 306 is configured to switch the primary-side controller 112 between the constant current mode and the constant voltage mode.

During operation of the primary-side controller 112 the mode controller 306 controls whether the primary-side controller 112 operates in a constant current mode or a constant voltage mode. Consider first the power converter 100 operating in a constant voltage mode. When the primary-side controller 112 operates in a constant voltage mode, the constant voltage controller 302 directs the storage of energy in the field of the transformer 106 by asserting the gate output 314 that couples to the second gate input 322 of the mode controller 306. In the constant voltage mode, the switch 326 couples the second gate input 322 to the gate terminal 136, and thus the signal on the gate output 314 is asserted on the gate terminal 136 (making the primary FET 116 conductive). The constant voltage controller 302 monitors the primary current by way of the current sense input 308, and maintains an output voltage as indicated based on the signal on the voltage setpoint output 340 of the mode controller 306. When the primary side current reaches the predetermined value, the constant voltage controller 302 ceases the storing of energy by de-asserting the gate output 314 (making the primary FET 116 non-conductive). The constant voltage controller 302 monitors a voltage on the auxiliary winding 110, by monitoring the voltage sense input 310, during periods when the primary FET 116 is non-conductive. In some embodiments, the constant voltage controller 302, creates a value indicative of output voltage, and compensates the predetermined value based on the value indicative of output voltage.

Thus, as the load rises and falls, the output voltage $V_{OUT}$ likewise rises and falls. Similarly, as the output voltage $V_{OUT}$ rises and falls, the predetermined value used to trigger the end of each energy storage cycle rises and falls. However, as the load increases above a certain point, the primary current peak value $I_{p\_pk}$ rises above a predetermined threshold. In the example system of FIG. 3, the mode controller 306 indirectly senses that the primary current peak value $I_{p\_pk}$ has met or exceeded the predetermined threshold by observance of the gate signal applied to the second gate input 322; however, in other cases the mode controller 306 may be provided the predetermined value and/or the primary current peak value $I_{p\_pk}$ value directly from the constant voltage controller 302.

Regardless of how the mode controller 306 makes the determination, when the predetermined value and/or the primary current peak value $I_{p\_pk}$ and/or a value correlated to the primary current peak value $I_{p\_pk}$ meets or exceeds the predetermined threshold, the mode controller 306 switches the primary-side controller 112 to the constant current mode by changing switch position of example switch 326. An example of a value correlated to the primary current peak value is:

$$I_{p\_pk} \frac{t_2}{T_{SW}} \qquad (10)$$

Moreover, in example systems the mode controller 306 drives a signal to the current set point output 338 to inform the constant current controller 304 of the current setting. The current setting could be the predetermined threshold discussed above, or the current setting may be another value (e.g., communicated to the mode controller 306 in any suitable form from a device coupled to the output voltage $V_{OUT}$).

When the primary-side controller 112 operates in the constant current mode, the constant current controller 304 directs the storage of energy in the field of the transformer 106 by asserting the gate output 334 that couples to the first gate input 320 of the mode controller 306. In the constant current mode, the switch 326 couples the first gate input 320 to the gate terminal 136, and thus the signal on the gate output 334 is asserted on the gate terminal 136 (making the primary FET 116 conductive). The constant current controller 304 monitors the primary-side current by way of the current sense input 328 and compares the primary-side current to the predetermined value related to the signal on the peak current input 332. The predetermined value can be a primary-side peak current setpoint. When the primary-side current reaches the predetermined value, the constant current controller 304 ceases the storing of energy by de-asserting the gate output 334 (making the primary FET 116 non-conductive).

As described previously, and in accordance with example embodiments, the constant current controller 304 indirectly senses or calculates the input voltage $V_{IN}$, which in turn is used to compensate the predetermined value. For example, using information such as the time the gate output 324 was asserted and de-asserted, the constant current controller 304 measures an "on time" of the primary FET 116 (time $t_{ON}$ described in FIG. 2). Additionally, the constant current controller 304 measures a discharge time (time $t_2$ described in FIG. 2), by monitoring the voltage sense input 330, and calculates a value indicative of input voltage of the power converter using the $t_{on}$ time and the $t_2$ time. The constant current controller 304 compensates the predetermined value based on the value indicative of input voltage. In one example embodiment, the constant current controller compensates by transmitting a signal on the bias output 336 coupled to the current sense terminal 138. Compensation by transmitting a signal on the bias output is discussed more below in relation to FIG. 4.

Figure 4:
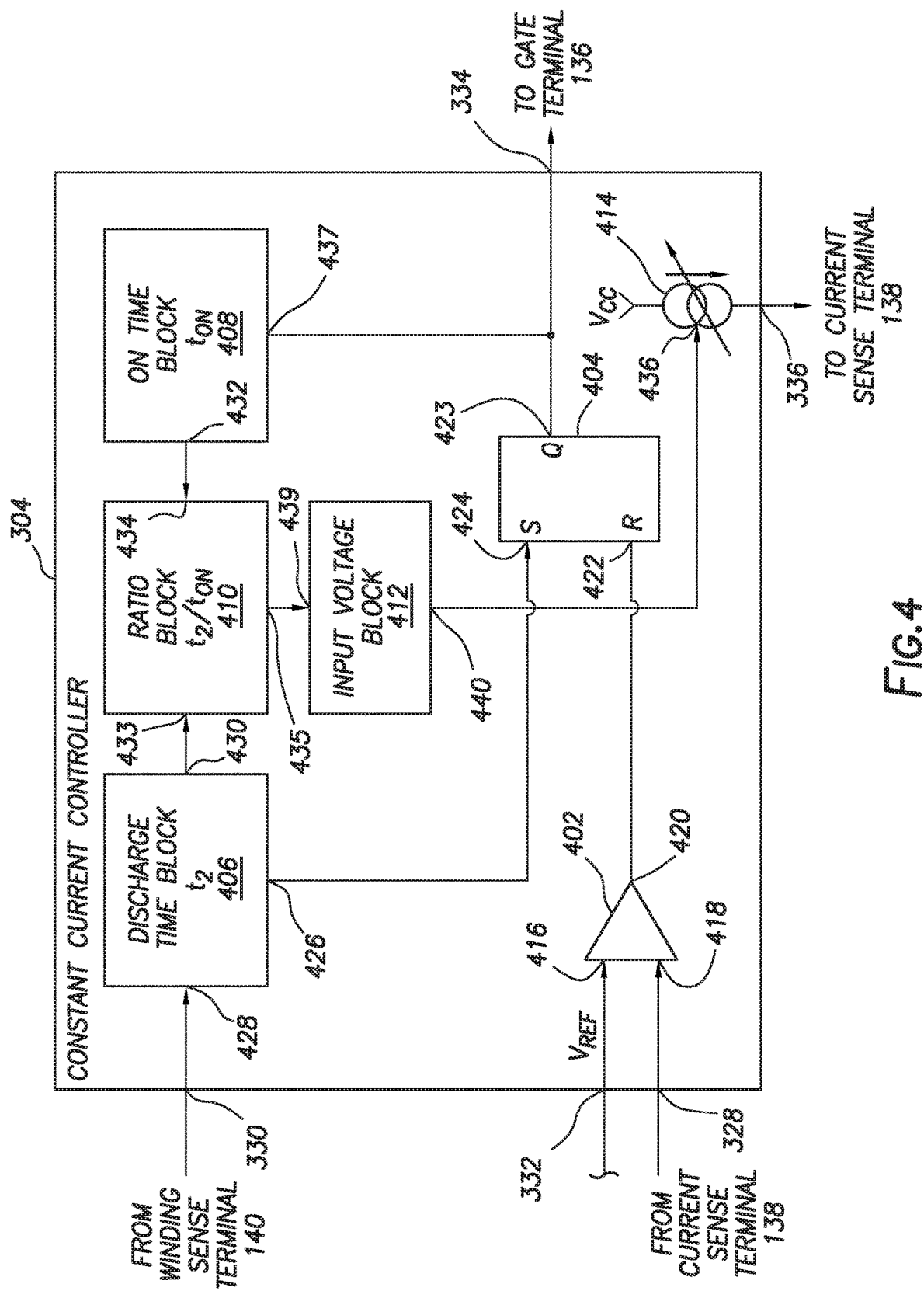
FIG. 4 shows a block diagram of a constant current controller in accordance with at least some embodiments.

FIG. 4 shows a block diagram of a constant current controller 304 in accordance with at least some embodiments. In particular, the example constant current controller 304 of FIG. 4 defines the voltage sense input 330, the current sense input 328, the bias output 336, and the gate output 334. Additional inputs and outputs may be present, but the additional connections are not shown so as not to unduly complicate the figure.

The example constant current controller 304 includes a discharge time block ($t_2$) 406, a ratio block ($t_2/t_{ON}$) 410, and an on time block ($t_{ON}$) 408. The example discharge time block 406 defines a sense input 428, a gate output 426, and discharge time output 430. The gate input 428 of the discharge time block 406 couples to the voltage sense input 330. The on time block 408 defines a gate input 437 and an on time output 432. The gate input 437 is coupled to the gate output 334. The ratio block 410 defines a discharge time input 433, an on time input 434, and a ratio output 435. The discharge time input 433 is coupled to the discharge time output 430 of the discharge time block 406. The on time input 434 is coupled to the on time output 432 of the on time block 408. The input voltage block 412 defines a ratio input 439 and a compensation output 440. The ratio input 439 couples to the ratio output 435 of the ratio block 410.

Still referring to FIG. 4, the example constant current controller 304 further includes latch 404 defining first input 424, a second input 422, and a latch output 423. In the example case of FIG. 4 the latch 404 is shown as a set-reset (SR) flip flop, but other latch structures may be used. The first input 424 is coupled to the gate output 426 of the discharge time block 406. The latch output 423 is coupled to the gate output 334 and the gate input 437 of the on time block 408. The example circuit further includes a comparator 402 that defines a Vref input 416, a current sense terminal input 418, and a comparator output 420. The Vref input 416 couples to the peak current input 332 and thus receives a reference signal from the example mode controller 306. The current sense terminal input 418 couples the current sense input 328. The comparator output 420 of the comparator 402 couples a second input 422 of the latch 404.

The example constant current controller 304 further includes a controlled-current source 414 defining a control input 436 and the bias output 336. The control input 436 is coupled to the compensation output 440 of the input voltage block 412. The bias output 336 is separate and distinct from the current sense input 328; however, in other cases the current produced by the controlled-current source 414 may be coupled to the current sense input 328 within the constant current controller 304.

The example discharge time block 406 is designed and constructed to monitor voltage on the voltage sense input 330 as indicative of the state of the discharge cycle. When the discharge cycle ends, the example discharge time block 406 performs two tasks. First, the discharge time block 406 determines the discharge time and produces a value indicative of the discharge time on the discharge time output 430. Thus, example discharge time block 406 produces a new value indicative of discharge time $t_2$ at the end of each discharge cycle. Second, when the discharge cycle ends the discharge time block 406 asserts the second output 426 to the latch 404, which in turn asserts the gate output 334 and thus begins the energy storage cycle. The example description of the timing of when the discharge cycle ends and the energy storage cycle begins has been simplified for purposes of this discussion. For example, in some embodiments, the start of the energy storage cycle following a discharge cycle is not instantaneous, instead there may be a slight delay between when the discharge cycle ends and a subsequent energy storage cycle begins (e.g., waiting for a first or second valley of the voltage ringing within the system once the current through the secondary reaches zero).

The example on time block 408 is designed and constructed to monitor the asserted and de-asserted conditions of gate output 334 as indicative of the state the energy storage cycle. In particular, the on time block 408 considers the energy storage cycle to begin when the gate output is asserted, and the on time block 408 considers the energy storage cycle to end when the gate output is de-asserted. When the energy storage cycle ends, the example on time block 408 determines the on time and produces a value indicative of the on time $t_{ON}$ to the on time output 432. Thus, example on time block 408 produces a new value indicative of on time $t_{ON}$ at the end of each energy storage cycle.

The example ratio block 410 is designed and constructed to produce a value indicative of the ratio of $t_2/t_{ON}$ using the value indicative of on time $t_{ON}$ from the on time block 408 and value indicative of discharge time $t_2$ from the discharge time block 406. The ratio block 410 may calculate the ratio "continuously," but the value only changes at the end of each cycle when a new value arrives.

The input voltage block 412 is designed and constructed to produce a value indicative of input voltage $V_{IN}$ using the ratio of $t_2/t_{ON}$ from the ratio block 410. In effect, the input voltage block 412 implements equation (9) above by multiplying the ratio of $t_2/t_{ON}$ by a constant. In other cases, the input voltage block 412 may be omitted, and the constant multiplier may be implemented as a gain of the controlled-current source 414.

Consider, for purposes of explanation, that the example constant current controller 304 of FIG. 4 is part of a power converter 100 (FIG. 1) operating in constant current mode, and further consider that an energy storage cycle has just ended. Thus, the gate output 334 is de-asserted, the discharge time block 406 is monitoring the voltage sense input 330. Because the energy storage cycle has just ended in this example, the on time block 408 produces the value indicative of on time $t_{ON}$ on the on time output 432 to the ratio block 410. The ratio block 410 calculates the values $t_{ON}$ or $t_2$ that holds the ratio constant. The ratio to be held constant is defined by the last calculated ratio while the power converter 100 was operating in the constant voltage mode.

Now consider that the discharge cycle has just ended. When the discharge cycle ends, the example discharge time block 406 performs two tasks. First, when the discharge cycle ends the discharge time block 406 asserts the second output 426 to the latch 404, which in turn asserts the gate output 334 and thus begins the next energy storage cycle (with some delays between the end of the discharge cycle and the next energy cycle). Second, the discharge time block 406 calculates or determines the discharge time and produces a value indicative of the discharge time $t_2$ on the discharge time output 430 to the ratio block 410. Thus, example discharge time block 406 produces a new value indicative of discharge time $t_2$ at the end of each discharge cycle.

The new energy storage cycle begins with the assertion of gate output 334. The on time block 408 begins anew monitoring the on time. Moreover, the example ratio block 410 produces an updated ratio $t_2/t_{ON}$ using the discharge time $t_2$ just produced by the discharge time block 406. In turn, the input voltage block 412 produces a new value indicative of input voltage $V_{IN}$, which is provided to the control input 436 of the controlled-current source 414. The controlled-current source 414, in turn, drives a bias current to the bias output 336 proportional to the value indicative of input voltage $V_{IN}$. In accordance with example embodiments, compensating the predetermined value 212 (FIG. 2) at which the primary-side controller 112 begins the process of ceasing the energy storage cycle is implemented by way of the bias current produced by the controlled-current source 414. More particularly, the controlled-current source 414 and related components change magnitude of the bias current driven to the bias output 336 responsive to the value indicative of input voltage $V_{IN}$.

In example systems and methods the magnitude of the bias current produced by the controlled-current source 414 is directly proportional to the magnitude of the value indicative of input voltage $V_{IN}$. And as described, compensating in the current energy storage cycle is based on the on time $t_{ON}$ and discharge time $t_2$ from the previous energy storage cycle and discharge cycle, respectively. Stated oppositely, a value indicative of input voltage of the power converter is calculated using the value indicative of on time and the value indicative of discharge time of a first energy storage cycle and first discharge cycle, and then the predetermined value used in a subsequent energy storage cycle is compensation based on the value indicative of input voltage.

Turning briefly to FIG. 1, the bias current driven by the controlled-current source thus flows out the current sense terminal 138. The bias current flow thus creates a bias voltage at the current sense terminal 138, the bias voltage proportional to the magnitude of the bias current and the combined resistances of resistor 130 and resistor 128. The higher bias voltage, the higher the apparent primary current, and oppositely, the lower the bias voltage, the lower the apparent primary current.

Returning to FIG. 4, and still considering the "new" energy storage cycle. In an early portion of the primary current ramping up during the "new" energy storage cycle, and before the primary current reaches the predetermined value, the control signal provided to the control input 436 changes based on the updated ratio $t_2/t_{ON}$ and thus the bias current changes, compensating the predetermined value. The comparator 402 continuously compares the instantaneous primary current (as sensed through the current sense input 328) to reference voltage on the Vref input 416. The comparator 402 asserts the comparator output 420 when the primary current reaches the predetermined value as compensated by the bias current. In turn, the latch 404 de-asserts the latch output 423, which de-asserts the gate terminal 136, thus ending the energy storage cycle. And the example process begins anew.

FIG. 5 is a method diagram in accordance with at least some embodiments. In particular, the method starts (block 500) and includes: storing energy in a field of a transformer arranged for flyback operation, the storing by making conductive a primary switch coupled to a primary winding of the transformer (block 502); ceasing the storing of energy when a primary current through the primary winding reaches a predetermined value (block 504); measuring on time of the primary switch during the storing of the energy, the measuring creates a value indicative of on time (block 506); transferring energy from the field of the transformer to a load through a secondary winding of the transformer (block 508); measuring discharge time of the energy from the field of the transformer during the transferring, the measuring of the discharge time creates a value indicative of discharge time (block 510); calculating a value indicative of input voltage of the power converter using the value indicative of on time and the value indicative of discharge time (block 512); and then compensating the predetermined value used in a subsequent storing energy step, the compensation based on the value indicative of input voltage (block 514. Thereafter the method ends (block 516).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of operating a power converter comprising:
   storing energy in a field of a transformer arranged for flyback operation, the storing by making conductive a primary switch coupled to a primary winding of the transformer;
   ceasing the storing of energy when a primary current through the primary winding reaches a predetermined value;
   measuring on time of the primary switch during the storing of the energy, the measuring creates a value indicative of on time;
   transferring energy from the field of the transformer to a load through a secondary winding of the transformer;
   measuring discharge time of the energy from the field of the transformer during the transferring, the measuring of the discharge time creates a value indicative of discharge time;
   calculating a value indicative of input voltage of the power converter using the value indicative of on time and the value indicative of discharge time; and
   then compensating the predetermined value used in a subsequent storing energy step, the compensation based on the value indicative of input voltage.

2. The method of claim 1 wherein calculating the value indicative of input voltage is performed without measuring input voltage.

3. The method of claim 1 further comprising operating the power converter in a constant current mode.

4. The method of claim 1 wherein compensating the predetermined value further comprises compensating the predetermined value used in an immediately subsequent storing energy step.

5. The method of claim 1 wherein compensating the predetermined value further comprises changing a magnitude of a current driven through a sense resistor coupled between the primary switch and a ground.

6. The method of claim 1 wherein compensating the predetermined value further comprises changing a bias current driven through a sense resistance coupled between the primary switch and ground directly proportional to the value indicative of input voltage, the bias current distinct from the primary current.

7. A primary-side controller for a power converter, the primary-side controller comprising:
   a gate terminal, a current sense terminal, and a winding sense terminal;
   the primary-side controller configured to:
      assert the gate terminal;
      measure a value indicative of primary current by way of the current sense terminal;
      de-assert the gate terminal when the value indicative of primary current reaches a predetermined value;
      create a value indicative of asserted time based on assertion of the gate terminal and de-assertion of the gate terminal;

monitor voltage on the winding sense terminal when the gate terminal is de-asserted, the voltage on the winding sense terminal indicative of discharge of energy from a field of a transformer arranged for flyback operation;

create a value indicative of discharge time based on the voltage on the winding sense terminal;

calculate a value indicative of input voltage of the power converter using the value indicative of asserted time and the value indicative of discharge time; and compensate the predetermined value used in a subsequent de-assertion of the gate terminal in a constant current mode based on the value indicative of input voltage.

8. The primary-side controller of claim 7 wherein when the primary-side controller compensates, the primary-side controller is further configured to compensate the predetermined value used in an immediately subsequent assertion and de-assertion.

9. The primary-side controller of claim 7 further comprising, during a constant voltage mode, the primary-side controller is configured to:

assert the gate terminal;

measure a value indicative of primary current by way of the current sense terminal;

de-assert the gate terminal when the value indicative of primary current reaches a peak current value;

create a value indicative of output voltage by monitoring a voltage on the winding sense terminal when the gate terminal is de-asserted; and compensate the peak current value used in a subsequent de-assertion of the gate terminal in the constant voltage mode based on the value indicative of output voltage.

10. The primary-side controller of claim 9 wherein the primary-side controller is further configured to switch from the constant voltage mode to the constant current mode when a value correlated to the peak current value exceeds a predetermined threshold.

11. The primary-side controller of claim 9 wherein the primary-side controller is further configured to switch from the constant current mode to the constant voltage mode when the value correlated to the peak current value falls below a predetermined threshold.

12. The primary-side controller of claim 7 further comprising:

a controlled-current source defining a current output and a control input, the current output coupled to the current sense terminal, and the control input coupled to the value indicative of input voltage;

wherein, in the constant current mode, the controlled-current source changes a magnitude of a current driven to the current sense terminal responsive to the value indicative of input voltage.

13. The primary-side controller of claim 7 further comprising:

a controlled-current source defining a current output and a control input, the current output coupled to the current sense terminal, and the control input coupled to the value indicative of input voltage;

wherein, in the constant current mode, the controlled-current source changes a magnitude of a current driven to the current sense terminal directly proportional to the value indicative of input voltage.

14. The primary-side controller of claim 7 further comprising the primary-side controller does not have a terminal configured to monitor input voltage.

15. A power converter comprising a primary side comprising:

a primary winding of a transformer;

an auxiliary winding of the transformer;

a primary field effect transistor (FET) coupled to the primary winding, the primary FET having a gate;

a sense resistor coupled between the primary FET and ground;

a primary-side controller defining a gate terminal, a current sense terminal, and a winding sense terminal, the gate terminal coupled to the gate, the current sense terminal coupled to a sense node defined between the primary FET and the sense resistor, and the winding sense terminal coupled to the auxiliary winding;

a secondary side comprising:

a secondary rectifier;

a secondary winding of the transformer coupled to the secondary rectifier, the secondary winding arranged for flyback operation;

wherein the primary-side controller is configured to:

store energy in a field of the transformer by making conductive the primary FET;

cease the storing of energy when a primary current through the primary winding reaches a predetermined value;

measure on time of the primary FET during the storage of the energy, the measurement creates a value indicative of on time;

measure discharge time of the energy from the field of the transformer during periods of time when the primary FET is non-conductive, the measurement of the discharge time creates a value indicative of discharge time;

calculate a value indicative of input voltage of the power converter using the value indicative of on time and the value indicative of discharge time; and compensate the predetermined value used in a subsequent storing energy step, the compensation based on the value indicative of input voltage.

16. The power converter of claim 15 wherein the primary-side controller further comprises:

a constant current controller that defines a current sense input, a voltage sense input, a peak current input, a gate output, and a bias output, the current sense input coupled to the current sense terminal, the voltage sense input coupled to the winding sense terminal, and the bias output coupled to the current sense terminal;

a constant voltage controller that defines a current sense input, a voltage sense input, a voltage setpoint input, a gate output, the current sense input of the constant voltage controller coupled to the current sense terminal, and the voltage sense input of the constant voltage controller coupled to the winding sense terminal;

a mode controller that defines a current setpoint output, a voltage setpoint output, a first gate input, a second gate input, and a gate output, the current setpoint output coupled to the peak current input, the voltage setpoint output coupled to the voltage setpoint input the first gate input coupled to the gate output of the constant current controller, the second gate input coupled to the gate output of the constant voltage controller, and the gate output of the mode controller coupled to the gate terminal;

the constant current controller configured to implement a constant current mode, the constant voltage controller configured to implement a constant voltage mode, and the mode controller configured to switch the primary-side controller between the constant current mode and the constant voltage mode.

17. The power converter of claim 16 wherein the constant voltage controller is configured to, during the constant voltage mode:
   store energy in the field of the transformer by making conductive the primary FET;
   cease the storing of energy when the primary current through the primary winding reaches a peak current value;
   create a value indicative of output voltage by monitoring a voltage on the auxiliary winding during periods when the primary FET is non-conductive; and
   compensate the peak current value used in a subsequent storage of energy, the compensation based on the value indicative of output voltage.

18. The power converter of claim 16 wherein the mode controller is further configured to switch the primary-side controller between the constant current mode and the constant voltage mode when a value correlated to a peak current value exceeds a predetermined threshold.

19. The power converter of claim 16 wherein the constant current controller further comprises:
   a controlled-current source that defines a control input and the bias output, the control input coupled to the value indicative of input voltage;
   wherein the controlled-current source changes magnitude of a current driven to the bias output responsive to the value indicative of input voltage.

20. The power converter of claim 15 further comprising the primary-side controller does not have a terminal configured to monitor input voltage.

* * * * *